(12) United States Patent
Golgiri et al.

(10) Patent No.: US 10,798,666 B2
(45) Date of Patent: Oct. 6, 2020

(54) METHOD AND APPARATUS FOR ADAPTIVE POWER USAGE IN TIME OF FLIGHT LOCALIZATION INSTANCES

(71) Applicant: FORD GLOBAL TECHNOLOGIES, LLC, Dearborn, MI (US)

(72) Inventors: Hamid M. Golgiri, Livonia, MI (US); Aaron Matthew DeLong, Toldeo, MI (US); Vivekanandh Elangovan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 50 days.

(21) Appl. No.: 16/274,423

(22) Filed: Feb. 13, 2019

(65) Prior Publication Data

US 2020/0260390 A1    Aug. 13, 2020

(51) Int. Cl.
*H04W 52/38* (2009.01)
*H04W 52/28* (2009.01)
*G01S 11/08* (2006.01)
*G07C 9/00* (2020.01)

(52) U.S. Cl.
CPC .......... *H04W 52/383* (2013.01); *G01S 11/08* (2013.01); *G07C 9/00309* (2013.01); *H04W 52/283* (2013.01); *G07C 2009/00357* (2013.01); *G07C 2209/63* (2013.01)

(58) Field of Classification Search
CPC ... H04W 52/283; H04W 52/383; G01S 11/08; G07C 9/00309; G07C 2209/63
See application file for complete search history.

(56) References Cited

U.S. PATENT DOCUMENTS

| | | | | |
|---|---|---|---|---|
| 9,667,284 | B1* | 5/2017 | Gean | ........................ H04W 4/10 |
| 9,846,220 | B2 | 12/2017 | Kong et al. | |
| 10,036,806 | B2* | 7/2018 | Wijbrans | ................ G01S 13/82 |
| 2015/0291127 | A1 | 10/2015 | Ghabra | |
| 2018/0374290 | A1* | 12/2018 | Bjorkengren | ....... B60R 25/2072 |

* cited by examiner

*Primary Examiner* — Saad A. Waqas
(74) *Attorney, Agent, or Firm* — Michael Spenner; Brooks Kushman P.C.

(57) ABSTRACT

A vehicle may determine a predefined communication scheme for localizing a user via time of flight (ToF), responsive to a request designated for fulfilment upon condition that a user is within a certain distance of a vehicle. The vehicle may identify a first user location via a first ToF localization using the predefined communication scheme and a second user location via time of flight using a lower power communication scheme, the lower power communication scene configured to use less power for user localization from a power source as compared to the predefined communication scheme. The vehicle may then, responsive to a difference between the first user location and the second user location being within a predefined threshold difference, save coordinate information indicative of a location of the request as being as suitable for use of the lower power communication.

17 Claims, 4 Drawing Sheets

METHOD AND APPARATUS FOR ADAPTIVE POWER USAGE IN TIME OF FLIGHT LOCALIZATION INSTANCES

TECHNICAL FIELD

The illustrative embodiments generally relate to methods and apparatuses for adaptive power usage in time-of-flight (ToF) localization instances.

BACKGROUND

As vehicles grow more complex, and as wireless interactions with other devices grow more expansive, different models of device localization for authenticating device commands to a vehicle are applied based on security constraints and precision of a given model.

For example, a user seeking to remote start a vehicle may need to be closer to the vehicle than a user seeking to remotely unlock the vehicle. Often, functions deemed to be high-security will require a closer proximity of the user to the vehicle than functions deemed to be low-security (e.g., a wireless request for current vehicle mileage may not require a close distance of the user to the vehicle).

Wireless signal measurement is a way to determine a distance between a device and a vehicle. However such techniques are subject to interference from intervening objects between the device and vehicle, and vary in effectiveness based on different wireless communication schemes that may be used.

SUMMARY

In a first illustrative embodiment, a system includes a processor configured to determine a predefined communication scheme for localizing a user via time of flight (ToF), responsive to a request designated for fulfilment upon condition that a user is within a certain distance of a vehicle. The processor is also configured to identify a first user location via a first ToF localization using the predefined communication scheme. The processor is further configured to identify a second user location via a second ToF localization using a lower power communication scheme, the lower power communication scene configured to use less power for user localization from a power source as compared to the predefined communication scheme and, responsive to a difference between the first user location and the second user location being within a predefined threshold difference, save coordinate information indicative of a location of the request as being as suitable for use of the lower power communication scheme for localization in future requests at locations corresponding to the coordinate information.

In a second illustrative embodiment, a system includes a vehicle processor configured to receive instruction to determine a user device proximity, using a time of flight (ToF) signal measurement, responsive to a device request. The processor is also configured to determine that a lower power communication scheme, lower in power draw from a power source than the power draw of a predefined preferred communication scheme, has been predetermined as suitable for executing the ToF measurement in a first area including a location of the vehicle. The processor is further configured to utilize the lower power communication scheme to send a signal for ToF measurement.

In a third illustrative embodiment, a method includes receiving an instruction to determine a proximity of a user device to a vehicle using a time of flight (ToF) signal measurement responsive to a present request. The method also includes identifying a stored predefined association between a first area that includes a location of the request and a lower power communication scheme that uses less power than a predefined preferred communication scheme associated with the present request. The method further includes utilizing the lower power communication scheme to send a signal for ToF measurement.

DETAILED DESCRIPTION

As required, detailed embodiments are disclosed herein; it is to be understood, however, that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
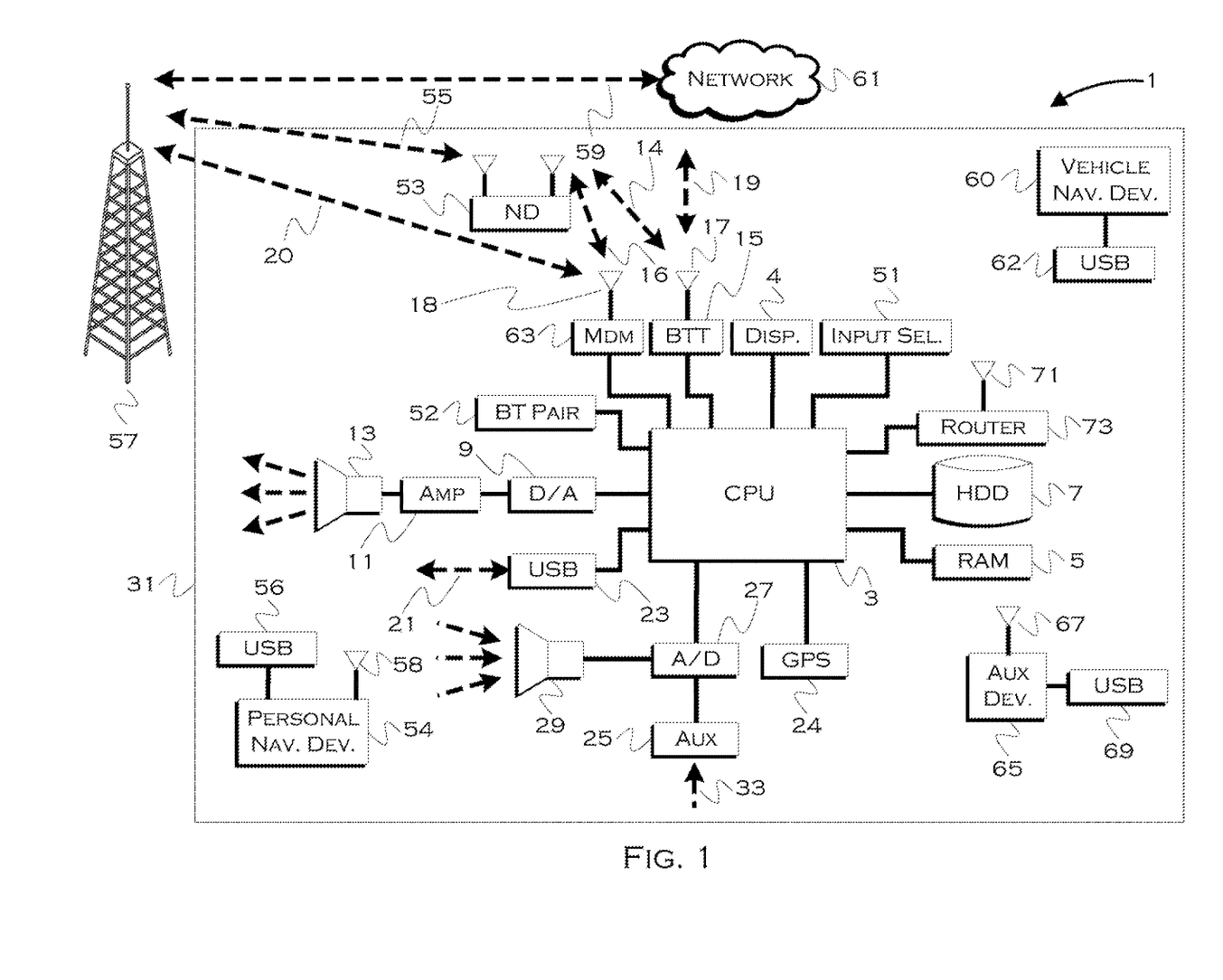
FIG. 1 shows an illustrative vehicle computing system for performing adaptive power usage in time-of-flight localization.

FIG. 1 illustrates an example block topology for a vehicle-based computing system 1 (VCS) for a vehicle 31. A vehicle provided with a vehicle-based computing system may contain a visual front-end interface 4 located in the vehicle. The user may also be able to interact with the interface if it is provided, for example, with a touch-sensitive screen. In another illustrative embodiment, the interaction occurs through, for example, button presses, spoken dialog system with automatic speech recognition and speech synthesis.

In the illustrative embodiment I shown in FIG. 1, a processor 3 controls at least some portion of the operation of the vehicle-based computing system. Provided within the vehicle, the processor 3 allows for onboard processing of commands and routines. Further, the processor 3 is connected to both non-persistent 5 and persistent storage 7. In this illustrative embodiment, the non-persistent storage 7 is random access memory (RAM) and the persistent storage 5 is a hard disk drive (HDD) or flash memory. In general, persistent memory 5 can include all forms of memory that maintain data when a computer or other device is powered down. These include, but are not limited to, HDDs, compact discs (CDs), digital video discs (DVDs), magnetic tapes, solid state drives, portable universal serial bus (USB) drives and any other suitable form of persistent memory.

The processor 3 is also connected to a number of different inputs allowing the user to interface with the processor 3. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone 29 and the auxiliary connector 33 is converted from analog to digital by a converter 27 before being passed to the processor. Although not shown, numerous of the vehicle components and auxiliary components in communication with the processor 3 may use a vehicle network (such as, but not limited to, a CAN bus) to pass data to and from the processor 3 (or components connected thereto).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as personal navigation device (PND) 54 or a USB device such as vehicle navigation device 60 along the bi-directional data streams shown at 19 and 21 respectively.

In one illustrative embodiment, the system uses the BLUETOOTH transceiver 15 to communicate via antenna 17 with a user's nomadic device (ND) 53 (e.g., cell phone, smart phone, PDA, or any other device having wireless remote network connectivity). The nomadic device 53 can then be used to communicate signal 59 with a network 61 outside the vehicle 31 through, for example, communication 55 with a cellular tower 57 or Wi-Fi access point.

Exemplary communication between the nomadic device 53 and the BLUETOOTH transceiver 15 is represented by signal 14.

Pairing of a nomadic device 53 with the BLUETOOTH transceiver 15 can be instructed through a button 52 or similar input. Accordingly, the processor 3 is instructed that the onboard BLUETOOTH transceiver 15 will be paired with a nomadic device.

Data may be communicated between processor 3 and network 61 utilizing, for example, a data-plan, data over voice, or DTMF tones associated with nomadic device 53. Alternatively, it may be desirable to include an onboard modem 63 having antenna 18 in order to cellularly communicate 16 data between processor 3 and network 61.

In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor 3 is provided with an operating system including an application programming interface (API) to communicate with modem application software. The modem application software may access an embedded module or firmware on the BLUETOOTH transceiver 15 to complete wireless communication 14 with a remote BLUETOOTH transceiver (such as that found in a nomadic device 53). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication format that can be used in this realm is free-space optical communication non-standardized consumer IR protocols.

In another embodiment, nomadic device 53 includes a modem for voice band or broadband data communication. In a data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broadband transmission and the system could use a much wider bandwidth (speeding up data transfer). In still another embodiment, nomadic device 53 is replaced with a cellular communication device (not shown) that is installed in vehicle 31. In yet another embodiment, the nomadic device 53 may be a wireless local area network (LAN) device capable of communication over, for example (and without limitation), a Wi-Fi network.

In one embodiment, incoming data can be passed through the nomadic device 53 via a data-over-voice or data-plan, through the onboard BLUETOOTH transceiver 15 and into the vehicle's internal processor 3. In the case of certain temporary data, for example, the data can be stored on the HDD 7 or other storage media until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61.

Further, the processor 3 could be in communication with a variety of other auxiliary devices 65. These devices can be connected through a wireless 67 or wired 69 connection (e.g. USB). Auxiliary devices 65 may include, but are not limited to, personal media players, wireless health devices, portable computers, and the like.

Also, or alternatively, the processor 3 could be connected to a vehicle based wireless router 73, using for example a Wi-Fi (IEEE 802.11) 71 transceiver. This could allow the processor 3 to connect to remote networks in range of the local router 73.

In addition to having exemplary processes executed by a vehicle computing system located in a vehicle 31, in certain embodiments, the exemplary processes may be executed by a computing system in communication with a vehicle computing system. Such a system may include, but is not limited to, a wireless device 53 (e.g., and without limitation, a mobile phone) or a remote computing system (e.g., and without limitation, a server on a remote network 61) connected through the wireless device 53 or a vehicle modem 63. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device 53, then it is likely that the wireless device 53 is not performing that portion of the process, since the wireless device 53 would not send and receive information with itself. One of ordinary skill in the art will understand when it is inappropriate to apply a particular VACS to a given solution.

Current systems that use signal measurement for distance calculations may suffer from several issues. For instance, such systems may be locked to use of a signal of a certain strength, which may result in excessive power usage out of caution, even when a signal of that predefined strength may not necessarily always required. That is, the manufacturer may set a given signal strength as having a reasonable likelihood of producing accurate results given a balance of factors. The system may maintain usage of that signal strength throughout various instances, despite the fact that in certain of those instances a lower-power signal may suffice. The illustrative embodiments improve these systems by recognizing and adapting to those instances.

In an example, using a certain communication scheme may produce increased accuracy but may come at the cost of increased power usage. Lower power schemes may reduce accuracy but save power. In this context, wireless communication schemes may be characterized by one or more of frequency, target distance, bandwidth, modulation technique, and protocol.

Further, current detection systems may be in an always-on state, which is to say that they are detecting the phone, fob, or other wireless device 53 nearly continually when the user is at home, for example, and the vehicle 31 is in a garage. Even though high-power solutions with high precision may be preferred in those instances due to interference from home walls and structure, aspects of the illustrative embodiments are also able to recognize these locations as being generally more secure and can adapt to a lower power solution, with less precision, in light of the fact that there is the additional security of the vehicle 31 being in a commonly observed home location. So, even if the detection is continual, adequate detection may be achieved at a lower precision setting at those locations to mitigate ongoing power draw.

By recognizing and adapting to specific location effects on signal precision, the illustrative embodiments may improve the overall power usage of the detection computing system at certain locations, increasing battery life of the overall system.

Figure 2:
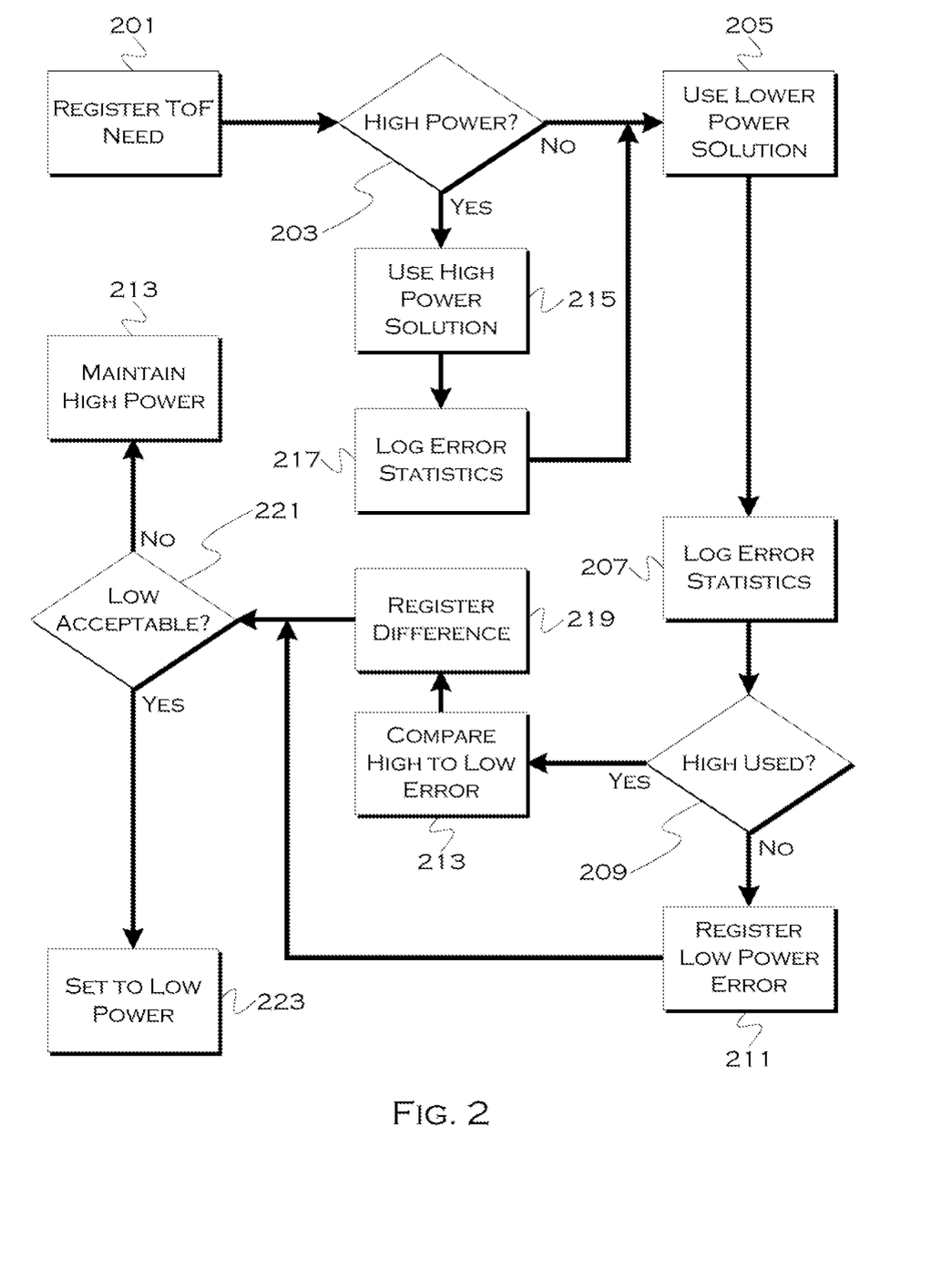
FIG. 2 shows an illustrative example of a location evaluation process.

FIG. 2 shows an illustrative example of a location evaluation process executable by a vehicle 31 processor 3. The vehicle 31 can use this process to detect a needed ToF (proximity) for a given situation (e.g., a manufacturer or developer preferred ToF) and then can test an error rate for both preferred and lower power solutions. While this testing may potentially use more power than simply using the initially-designated solution, if it is established through the testing that a lower power solution is acceptable for that location, applying the detected results will decrease power usage over the long term.

ToF localization may be the result of manufacturer specifications (e.g., a request from a certain device 53 or of a certain type) that dictate a maximum error tolerance for the type of request or a function (e.g., CAN bus data inquiry vs. remote start) performed as a result of the request. In other instances, an application generating the request, or the vehicle 31 process responding to the request, may also define maximum error tolerances. Maximum error tolerance can effectively be translated into which communication scheme should be used to service the request, although the defining entity can also simply define a preferred or mandated communication scheme designated to accommodate the preferred error tolerance. Thus, a lookup table or individual applications can specify, for example, both minimum distances (determinable by ToF) and a maximum error tolerance or signal type to use, for a given specific or type of request.

In this example, the vehicle 31 determines that a ToF solution is necessary at operation 201. For example, the vehicle 31 may receive a request having a mandatory distance from vehicle 31 for fulfilment (being within that distance), and further the request (or a manufacturer) may mandate a maximum error tolerance based on the type of request, a requesting device 53, or a function performed responsive to the request. This can help the process determine if a ToF localization, to validate the request, should be fulfilled at 203 via a high-power solution (or a specific solution being at a higher power than at least one lower power alternative).

If the solution is a higher (than the lowest possible) power solution, the vehicle 31 uses the higher power solution at operation 215. Use of this solution will result in a ToF calculation that provides an approximation of user-distance from the vehicle 31. Additional attempts will create a margin of error, because the results will often not be exactly the same, and the vehicle 31 can log the error statistics at operation 217. These statistics can be used as an alternative source to determine if the chosen communication scheme falls within constraints. In some instances, the additional attempts will be done rapidly following the first attempt, so that user movement has a minimal effect on a change in results.

Additionally or alternatively, comparison to "optimal" errors for a given communication scheme can occur, to determine the likelihood of interference or other variables affecting results. For example, 60 GHz requests may have an optimal error tolerance within 0.1 meters. If successive 60 GHz requests resulted in excessive error, there is a reasonable assumption that there is a degree of interference present at the location. Whether or not this error was the result of user movement, for example, between requests, can be determined in part based on movement detection via device 53 accelerometers, if the requesting device 53 includes such sensors.

In addition to using the higher power solution, the vehicle 31 may also use a lower power solution at 205. This is the "testing" scenario, where the vehicle 31 attempts to determine what impact on results would be achieved by using the lower power solution. For example, a 5 GHz solution generally has an optimal error range around 1.2 meters. So, if the request was designated to be serviced at a short distance with error of no more than 1.7 meters, all 5 GHz attempts may not produce these results. But, some 5 GHz ToF calculations could produce these results, since 1.7 is above the minimum error rate for 5 GHz attempts. On the other hand, many situations with interference may produce error above the tolerable threshold with respect to 5 GHz attempts, and so the vehicle 31 may default to the 60 GHz solution to ensure that the estimated distance is almost certainly within the desired margin of error.

By testing the 5 GHz solution at 205, the vehicle 31 can perform similar error calculation and recording at operation 207. This allows the vehicle 31 to determine the margin of error at the 5 GHz solution at 207, both relative to multiple 5 GHz attempts and/or relative to the more precise 60 GHz attempt. If the 60 GHz attempt places the user at 10 meters with error of 0.14 meters, and the 5 GHz attempt places the user at 11.3 meters, the process may assume that the user is essentially no more than 9.86 meters away from the vehicle 31, and thus the 5 GHz attempt is producing a result within the maximum margin of error (1.7 meters) from the actual location. Multiple attempts over a period of days or longer, and/or under different environmental conditions, at the same location, may reveal that 5 GHz is a perfectly acceptable solution for determining the distance to the user at this location, because of limited interface, for example, allowing the 5 GHz solution to function at the low end of its error range.

The location itself may be defined by a vehicle 31 GPS coordinates, an address, phone coordinates, etc., or some combination of the preceding. Unless walking down a hallway to a garage or out of a doorway when a request is made, the user is almost never at exactly the same location as when previous requests were made, nor is the vehicle 31. Thus, for purposes of continued evaluation, the vehicle 31 may use a modified form of a registered GPS location for future evaluation attempts.

For example, the vehicle 31 could first use a radius around the vehicle 31 GPS location or an address associated with the GPS location. This would often be an acceptable solution in a driveway or certain parking lots but may present issues with respect to parking garages and frequently-crowded parking lots. In the garage/crowded lot scenario, there may be more common interference at certain locations (more structure/cars can increase interference), and so using a large range as a proxy for a location may not produce desirable results.

If successive attempts tended to indicate occasional success with lower power communication scheme attempts and occasional failures, the vehicle 31 may use a more refined location, which may employ a directionality component. If the vehicle 31 employs a radius or distance from the vehicle 31, as a boundary defining an area corresponding to the registered GPS coordinates, that radius could be based on the initial and/or future distances of the requesting device 53 from the vehicle 31. That is, requests within this range would be treated as occurring at the registered GPS coordinates for evaluation purposes, subject to any further constraints such as directionality (of the device 53 relative to the vehicle 31) limitations. Directionality may be useful as a factor because a device SW of a vehicle at a given location may experience no interference (e.g., a clear path from a doorway to a vehicle), but a device NW at the same distance may experience significant interference from intervening vehicles (e.g., the same distance NW of the vehicle is in the center of a crowded lot).

Also, the vehicle 31 may wait until a particular GPS location or address is observed more than a predetermined number of times before applying or even beginning the multi-communication scheme attempts. If a user only visits a store once in their life, whether or not the lower power communication scheme is acceptable at that location is probably irrelevant to that user. On the other hand, if the system were employed to crowd-source situations where the lower power communication scheme might be acceptable, the vehicle 31 may perform the multi-communication scheme attempt at virtually any location, or at least any location corresponding to a publicly accessible or commonly-utilized (by a number of users) location. Even if the single test is not relevant to the specific user, because the specific user will not likely return, the data is useful to crowdsource a determination of whether a lower power solution is generally acceptable at that location.

In this example, if both a higher and lower power communication scheme attempt were made at 209, the vehicle 31 may compare the results of the two at 213, which can include comparing actual detected locations, errors relative to each other and to maximum errors, etc. The relative difference between the two results can be registered at 219. If the process only used a single solution, the vehicle 31 can register the error at 211 for that location, and/or register the difference between the error and a known minimum error.

If the lower power solution is acceptable at 221, or remains acceptable if already implemented, the vehicle 31 can set or maintain the lower power solution as suitable for the GPS location at 223. Otherwise, the process may maintain or revert to the higher power solution at 225.

Since construction can occur and conditions can change over time, a vehicle 31 using a lower power solution under a circumstance where a higher power solution may generally be designated may periodically test the dual communication scheme results to confirm the acceptability of continuing to use the lower power solution.

Figure 3:
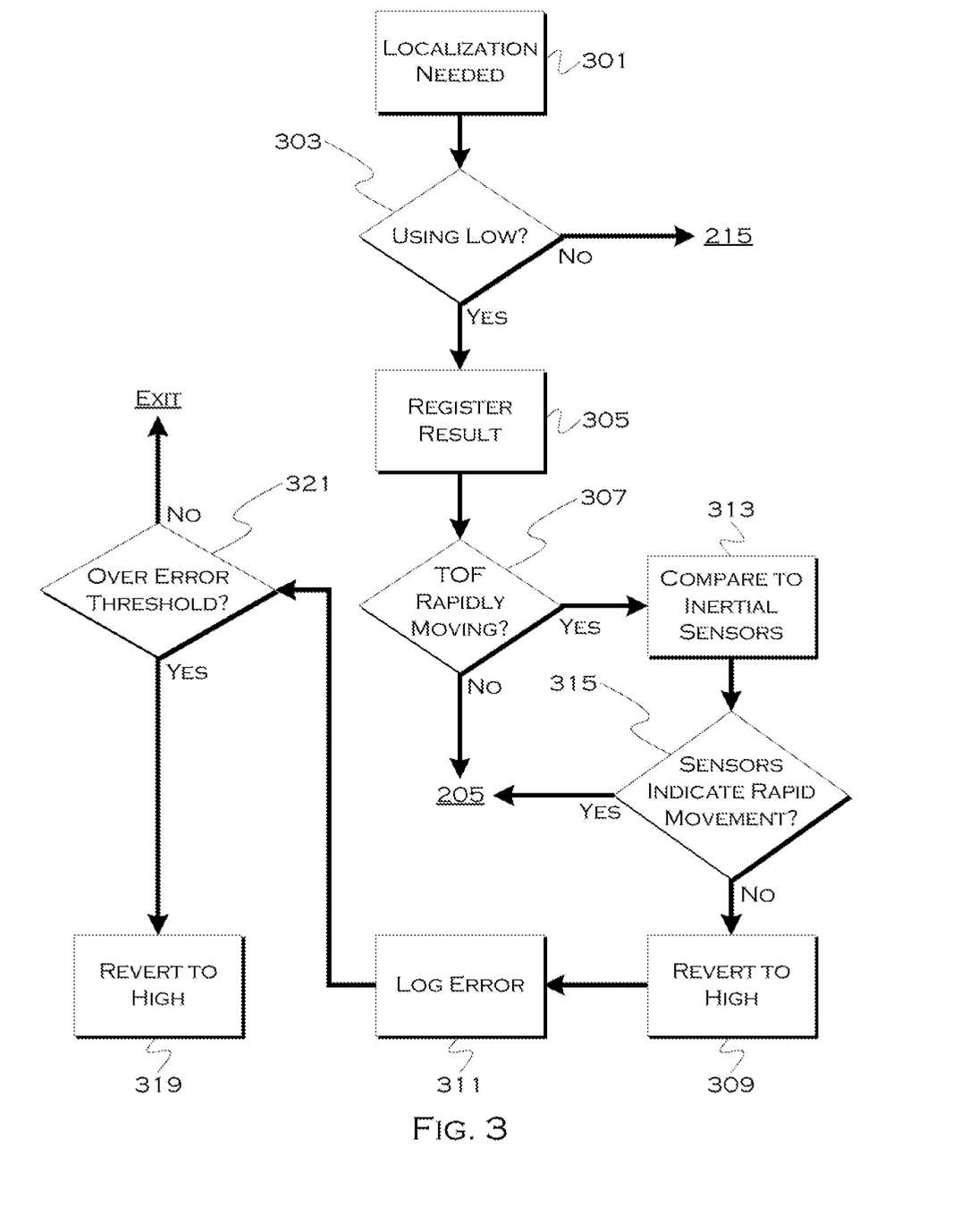
FIG. 3 shows an illustrative example of a reversion/adaptation process.

FIG. 3 shows an illustrative example of a reversion/adaptation process executable by a vehicle 31 processor 3, for example. In this example, the vehicle 31 may be using a lower power solution pursuant to an embodiment similar to that described in FIG. 2. At the same time, the immediate circumstances may dictate a one-off reversion to a higher power solution. This is an example of how requesting or responding device 53 sensors (on a device 53 carried by the user, for example) can supplement a decision on the fly.

In this example, the vehicle 31 determines when localization is needed at operation 301. If the solution is not using a lower (or lowest reasonable power) solution at 303, the vehicle 31 will proceed to 305. If the vehicle 31 is using the higher power or "preferred" (by the manufacturer, for example) frequency, the process can proceed to operation 215 to ensue testing for that location. This is also assuming that any frequency-of-visit parameters are met for the location. A reasonable lowest-power solution can be, for example, a solution that is projected to produce reasonable results for the location, but which does not have excessive error associated therewith. For example, a 900 MHz solution may have a very high margin of error, and thus may be determined to be always an unsuitable replacement for a 60 GHz solution, so it may be the case that the "lowest reasonable solution" for a primarily 60 GHz solution is 2.4 GHz.

If the process proceeds to operation 305, the vehicle 31 may also attempt to determine if the user is rapidly moving at 307. Rapid movement may result in unexpected changes and may be reflected by successive results of projected distance being outside an expected margin of error. Rapid movement could cause a solution to falsely adapt a higher power communication scheme, as it would appear that the lower power solution is resulting in excessive error, but really the movement, not the communication scheme, is the cause of the apparent error. When successive localization results reflect unexpected differences in results, the vehicle 31 may also receive data from device 53 sensors at 313. This data from sensors such as accelerometers, may indicate the movement and thus the "excessive error" may be determined to not actually exist at 315. This is because a difference in successive distances is explainable by movement, not by error.

On the other hand, if there is no indication (from sensors) that the device 53 is moving or moving quickly, the vehicle 31 may determine that a higher power (such as the preferred solution) solution is suitable at 309. This can be, as noted above, because changes to the local environment render the lower power solution temporarily or permanently unsuitable.

So, for example, the vehicle 31 may revert to the originally preferred communication scheme and may log the occurrence of the error at 311. Logging the error can track the number of times, or successive times, the lower power solution failed, and one or more (a threshold) such instances at 321 may cause the vehicle 31 to reassign the GPS location, that was the basis for using the lower power communication scheme, as appropriate for a higher or the original high-power solution at 319. Alternatively, recognizing the possible excessive error could cause the system to revert to the test process similar to FIG. 2.

Figure 4:
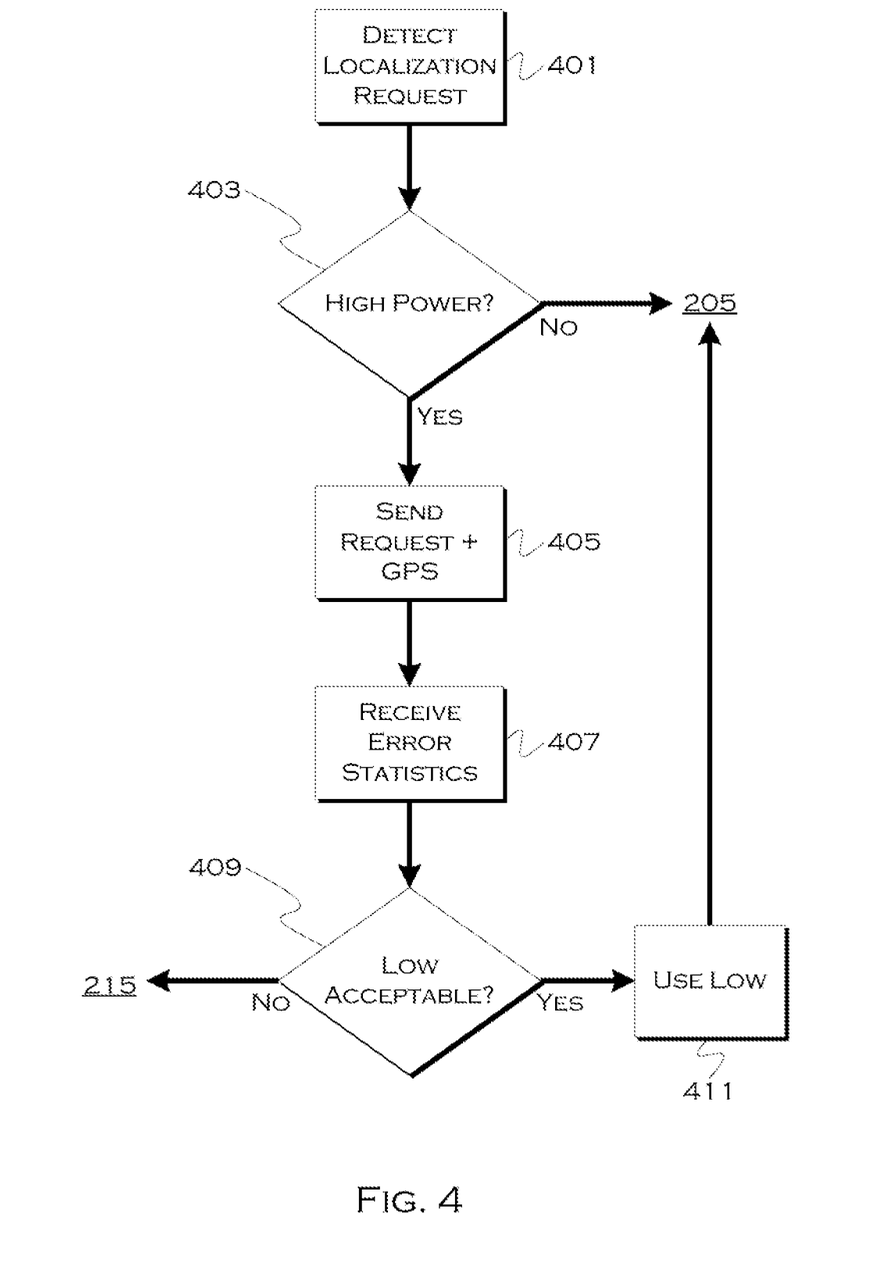
FIG. 4 shows an illustrative process for ongoing adaptation.

FIG. 4 shows an illustrative process for ongoing adaptation, executable by a device 53, for example. In this embodiment, the device 53 is responding to a localization request from an application executing on the device 53, starting with detecting the request at operation 401. If the request includes a designation of a communication scheme for ToF measurement, or if the device 53 determines that the communication scheme for ToF measurement is suitable for executing at a higher (than a possible lowest) power solution at operation 403, the device 53 sends at 405 the localization request and GPS coordinates of the device 53 to the vehicle.

If the device 53 determines that the lowest possible power localization is associated with the request at 403, the device 53 does not need to send a higher power request because the lowest possible power solution is already deemed acceptable.

In response to the request, the device 53 receives error statistics previously associated with the GPS coordinates at 407. Based on those error statistics, the device 53 may determine that a lower power solution is acceptable for the present location at 409 and may attempt localization with a lower power solution at 411. This sort of information exchange process relating to a device-originated localization request may be useful if a device 53 determines which solution to use for localization with regards to applications on the device, but does not have access to all error statistics saved with respect to various GPS locations, which can be stored on the vehicle 31.

The illustrative embodiments allow for improved and adaptive power utilization strategies with respect to ToF localization solutions for determining the distance between a vehicle 31 and a device 53.

Computing devices described herein generally include computer-executable instructions where the instructions may be executable by one or more computing devices such as those listed above. Computer-executable instructions, such as those of the processes described herein, may be compiled or interpreted from computer programs created using a variety of programming languages and/or technologies, including, without limitation, and either alone or in combination, JAVA™, C, C++, C #, VISUAL BASIC, JAVASCRIPT, PYTHON, JAVASCRIPT, PERL, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety and are understood to be examples of types of processes that may be performed to achieve elements of the invention. Additional steps may be added or removed from the exemplary processes as desired.

With respect to the illustrative embodiments described in the figures showing illustrative process flows, it is noted that a general-purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising: a processor configured to: determine a predefined communication scheme at 60 GHz for localizing a user via time of flight (ToF), responsive to a request designated for fulfilment upon condition that a user is within a certain distance of a vehicle;
   identify a first user location via a first ToF location using the predefined communication scheme;
   identify a second user location via a second ToF localization using a lower power communication scheme within 2.4 GHz to 5 GHz, the lower power communication scheme configured to use less power for user localization from a power source as compared to the predefined communication scheme; and
   responsive to a difference between the first user location and the second user location being within a predefined threshold difference, save coordinate information indicative of a location of the request as being suitable for use of the lower power communication scheme for localization in future requests at locations corresponding to the coordinate information, wherein the coordinate information comprises one or more of a vehicle Global Positioning System (GPS) location, an address associated with the vehicle GPS location, or GPS coordinates of the request.

2. The system of claim 1, wherein the predefined communication scheme is based on manufacturer security requirements for a function performed responsive to the request.

3. The system of claim 1, wherein the predefined communication scheme is based on application requirements specified by an application generating the request.

4. The system of claim 1, wherein the coordinate information includes coordinates of a device from which the request originated.

5. The system of claim 1, wherein the locations corresponding to the coordinate information include locations within a predefined distance of a location defined by the coordinate information.

6. The system of claim 5, wherein the predefined distance measured between the first user location and the coordinate information.

7. A system comprising: a vehicle processor configured to: receive instruction to determine a user device proximity, using a time of flight (ToF) signal measurement, responsive to a device request;
   determine that a lower power communication scheme within 2.4 GHz to 5 GHz, lower in power draw from a power source than the power draw of a predefined preferred communication scheme at 60 GHz has been predetermined as suitable for executing the ToF measurement in a first area, wherein the first area includes a predefined area around a defined coordinate point that was previously associated with successful use of the lower power communication scheme, and further wherein the defined coordinate point in the first area comprises one or more of a vehicle Global Positioning System (GPS) location, an address associated with the vehicle GPS location, or GPS coordinates of a previous device request; and utilize the lower power communication scheme to send a signal for ToF measurement.

8. The system of claim 7, wherein the predefined preferred communication scheme is included in the device request.

9. The system of claim 7, wherein the predefined preferred communication scheme is defined based on a type of the device request corresponding to one of a set of predefined request types having predefined communication schemes associated therewith.

10. The system of claim 7, wherein the predefined preferred communication scheme is defined based on a type of action to be taken in response to the device request corresponding to one of a set of predefined actions having predefined communication schemes associated therewith.

11. The system of claim 7, wherein the processor is further configured to: determine that the lower power communication scheme, lower than a predefined preferred communication scheme, has been predetermined as suitable for executing the ToF measurement in a second area including a location of the device received from the device.

12. The system of claim 11, wherein the second area includes a predefined area around a defined coordinate point that was previously associated with successful use of the lower power communication scheme.

13. A method comprising: receiving an instruction to determine a proximity of a user device to a vehicle using a time of flight (ToF) signal measurement responsive to a present request;

identifying a stored predefined association between a first area that includes a location of the present request and a lower power communication scheme within 2.4 GHz to 5 GHz that uses less power than a predefined preferred communication scheme at 60 GHz associated with the present request, wherein the first area is defined by stored location coordinates stored for a location where the lower power communication scheme was previously determined to be suitable to measure ToF in response to a previous request having a common characteristic shared with the Present request and coordinates within a predefined distance of the stored location coordinates, and further wherein the stored location coordinates in the first area comprises one or more of a vehicle Global Positioning System (GPS) location, an address associated with the vehicle GPS location, or GPS coordinates of the previous request; and utilizing the lower power communication scheme to send a signal for ToF measurement.

14. The method of claim 13, wherein the request-associated location includes vehicle coordinates.

15. The method of claim 13, wherein the request-associated location includes device coordinates received from the user device.

16. The method of claim 13, wherein the first area is constrained to coordinates within the predefined distance and existing within a predefined heading from the stored location coordinates.

17. The method of claim 13, wherein the common characteristic includes at least one of a predefined request type or a predefined action type representing an action taken responsive to the request.

* * * * *